United States Patent
LeBaron

(10) Patent No.: US 11,834,352 B2
(45) Date of Patent: Dec. 5, 2023

(54) SYSTEM AND METHOD FOR TREATMENT OF A PROCESS FLUID TO INACTIVATE UNDESIRABLE ORGANISMS

(71) Applicant: E. Shem LeBaron, Delta, UT (US)

(72) Inventor: E. Shem LeBaron, Delta, UT (US)

(73) Assignee: LeBaron IP Holdings, LLC, Hinckley, UT (US)

( * ) Notice: Subject to any disclaimer, the term of this patent is extended or adjusted under 35 U.S.C. 154(b) by 729 days.

(21) Appl. No.: 16/575,162

(22) Filed: Sep. 18, 2019

(65) Prior Publication Data

US 2020/0189935 A1 Jun. 18, 2020

Related U.S. Application Data

(60) Provisional application No. 62/700,294, filed on Jul. 18, 2018.

(51) Int. Cl.
*C02F 1/32* (2023.01)
*B08B 9/08* (2006.01)

(52) U.S. Cl.
CPC ............ *C02F 1/325* (2013.01); *B08B 9/0808* (2013.01); *C02F 2209/11* (2013.01)

(58) Field of Classification Search
CPC ................. A61L 2/00; C02F 1/32; B03B 9/08
See application file for complete search history.

(56) References Cited

U.S. PATENT DOCUMENTS

| 864,664 A | 8/1907 | Mild |
|---|---|---|
| 2,554,546 A | 5/1951 | Zahm |
| 3,672,823 A | 6/1972 | Boucher |
| 4,095,307 A | 6/1978 | Brubaker |
| 4,798,702 A | 1/1989 | Tucker |
| 4,983,307 A | 1/1991 | Nesathurai |
| 5,069,885 A | 12/1991 | Ritchie |
| 5,780,860 A | 7/1998 | Gadgil et al. |
| 5,997,812 A * | 12/1999 | Burnham .................. C02F 1/32 210/695 |
| 6,501,079 B1 | 12/2002 | Furuya |
| 6,576,201 B1 | 6/2003 | Woo et al. |
| 6,773,608 B1 | 8/2004 | Hallett et al. |
| 6,897,452 B2 | 5/2005 | McDonald et al. |
| 6,916,452 B1 | 7/2005 | Rix et al. |
| 7,543,354 B2 | 6/2009 | Lee et al. |
| 7,857,972 B2 | 12/2010 | Foret |

(Continued)

FOREIGN PATENT DOCUMENTS

WO WO-2016020693 A1 * 2/2016 ................ B01F 5/04

OTHER PUBLICATIONS

M.T.T. Tran, M. Farid. Innovative Food and Science and Emerging Technologies 5 (Dec. 2004) 495-5002 "Ultraviolet treatment of orange juice".

*Primary Examiner* — Walter D. Griffin
*Assistant Examiner* — Cameron J Allen
(74) *Attorney, Agent, or Firm* — Perry S. Clegg; Johnson & Martin, P.A.

(57) ABSTRACT

System and method for treatment of a process fluid using ultraviolet light are provided. The system may have a wall, an inlet pipe and at least one length of brushes configured to brush a fluid along a side of the wall, generating a film on the fluid to be exposed to ultraviolet light as the fluid film flows along the wall. The system and method may further utilize at least one channel to provide fluid to the wall.

68 Claims, 11 Drawing Sheets

(56) References Cited

U.S. PATENT DOCUMENTS

| | | | |
|---|---|---|---|
| 7,862,728 B2 | 1/2011 | Yencho | |
| 8,080,165 B2 | 12/2011 | Forney | |
| 8,806,697 B1 | 8/2014 | Davila, Jr. | |
| 9,737,862 B2 | 8/2017 | Smith | |
| 2003/0141457 A1 | 7/2003 | Nakagawa et al. | |
| 2008/0203004 A1 | 8/2008 | Abe et al. | |
| 2009/0159461 A1 | 6/2009 | McCutchen et al. | |
| 2011/0024646 A1 | 2/2011 | Abe et al. | |
| 2012/0011874 A1 | 1/2012 | Conradt et al. | |
| 2017/0100494 A1* | 4/2017 | Dobrinsky | A23C 3/076 |

\* cited by examiner

SYSTEM AND METHOD FOR TREATMENT OF A PROCESS FLUID TO INACTIVATE UNDESIRABLE ORGANISMS

CROSS-REFERENCE TO RELATED APPLICATIONS

This application claims the benefit of U.S. Provisional Patent Application No. 62/700,294, filed Jul. 18, 2018, for System and Method of a Process Fluid to Inactivate Undesirable Organisms, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. The Field of the Present Disclosure

This disclosure is particularly directed towards a system and method for process fluids. Specifically, this invention is directed towards the inactivation of undesirable organisms in process fluids.

2. Description of the Related Art

One method of deactivating undesirable organisms in fluids is by exposure to ultraviolet radiation (herein sometimes referred to as "UV light"). The UV light irradiates the fluid as exposure kills or deactivates bacteria, viruses, and other microorganisms. Lengthy exposure to UV light, however, results in organoleptic and nutritional degradation. Other methods, such as heat treatment, have similar problems, as sufficient heat to a fluid destroys microbes but also destroys nutrients and proper color and suitable fragrance, which destruction is undesirable for many fluids.

UV light treatment of clear or light fluids, for example fluids which are less resistant to the passing of UV wavelengths, can be an effective method of reducing microbes in these types of fluids as UV light readily penetrates through the fluid, generating a high log reduction of microbes without prolonged exposure to the UV light. Opaque and/or dark fluids are more difficult to effectively treat. Traditional UV light treatment penetrates only a small portion of these darker fluids. To combat this issue, extreme turbulence and exposure is used to generate a high log reduction of microbes similar to that of light or clear fluids. In some cases, dark fluids must be exposed to UV light thousands of times before a high log reduction of microbes is achieved. This results in significant organoleptic and nutritional degradation of the fluids.

Additionally, UV light treatment of fluids is often performed with a layer of material like quartz or Teflon® (or a material(s) having similar properties) separating the UV light from the fluid. This often results in mineral and bio-film deposits on the surface of the material separating the UV light from the fluid, decreasing or blocking UV light penetration into the fluid, rendering the UV treatment somewhat to completely ineffective, depending on the level of UV light is blocked by the deposits. These deposits can also block fluid flow, especially where fluid flow is restricted to increase turbulence, often requiring a whole section of a system to be replaced or cleaned before production can resume.

Thus, it would be an improvement to process fluids, especially those that are not clear or light, with a treatment system that results in a high log reduction of microbes in the fluid without a significant nutritional or organoleptic degradation of the fluid and without build up in the system preventing UV light from penetrating the fluid.

BRIEF SUMMARY

Systems and methods to process fluids are described herein. In one illustrative embodiment, the system includes an ultraviolet light source and a vessel.

The advantages and features of the present disclosure will become more fully apparent from the following description and appended claims, or may be learned by the practice of the present disclosure as set forth hereinafter.

DETAILED DESCRIPTION

Figure 1:
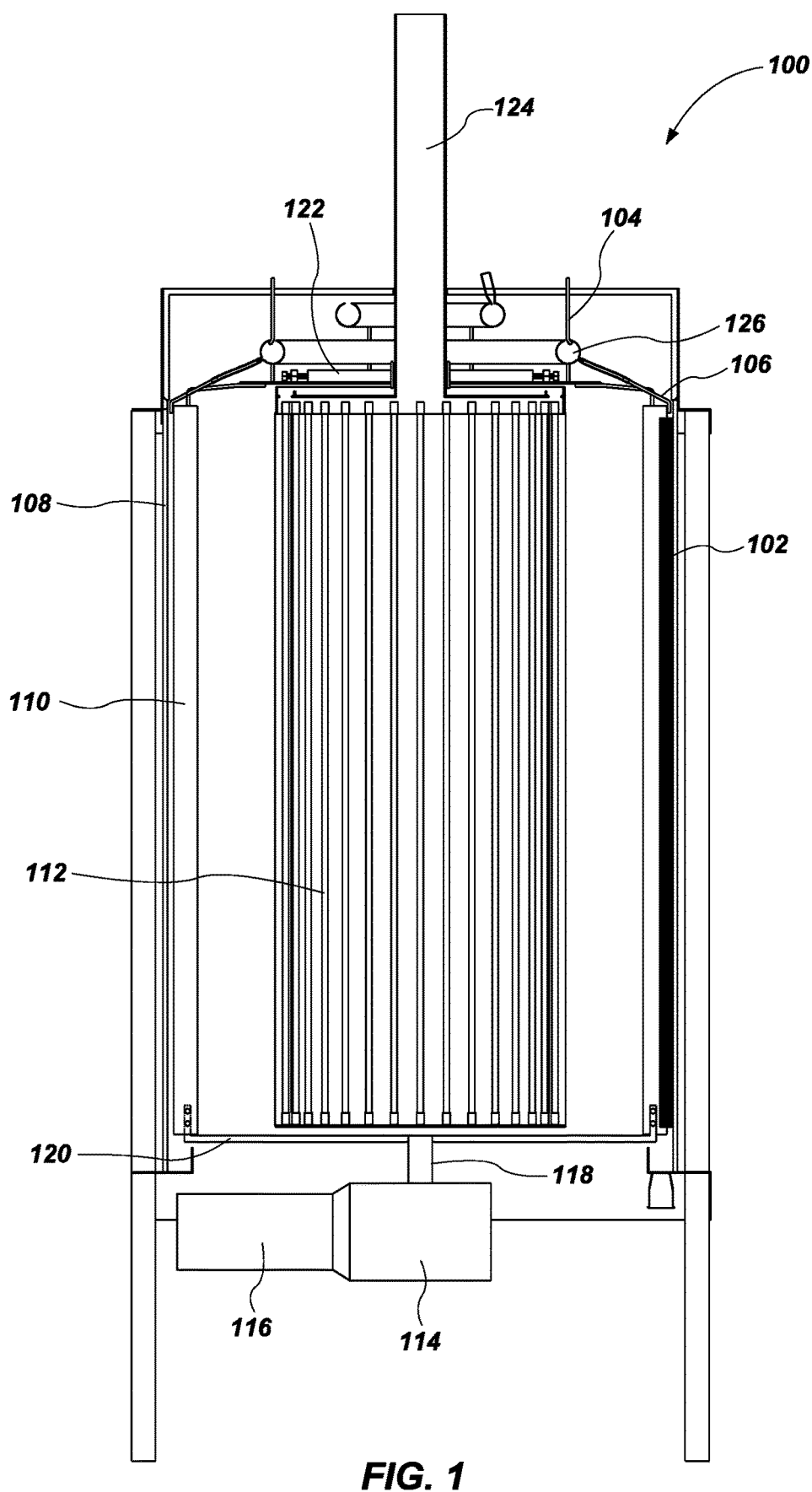
FIG. 1 is a longitudinal view of a system according to embodiments of the present disclosure.

The system and method for treatment of a process fluid using ultraviolet light described below allows for a system that processes fluids, including dark fluids, desirably providing a high log reduction of microbes with very little organoleptic and nutritional degradation of the fluid.

For the purposes of promoting an understanding of the pertinent principles in accordance with this disclosure, reference will now be made to the embodiments described herein and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present system and method are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, un-recited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

The terms "weight percent," "percent by weight," and "% by weight" all refer to the concentration of a component substance as the weight of the component substance divided by the weight of the composition multiplied by 100. The weight percentages referred to herein shall be considered to include the ranges 1-2, 2-3, 1-3 and all the values within. Thus, if the weight percentage is 10, this may include the values 7 and 13 and all the values between those.

This disclosure describes a system and method of processing a fluid using ultraviolet ("UV") light to reduce microbes while not significantly degrading organoleptic and nutritional properties of the fluid.

Compositions of this invention may be intended for fluids of varied properties including fluids that are clear, opaque, or dark and is especially useful for fluids that let little light through them. Nutritional fluids such as supplements, juices, milks, and other fluids for human or animal consumption are envisioned. Fluids for medical and/or beauty procedures and practices may also benefit from the system and method of processing disclosed herein. Any fluid where it is desirable to maintain organoleptic and other properties easily damaged by prolonged exposure to UV light where it is also desirable to reduce microbial presence within said fluids, may benefit from processing using the systems and methods described herein.

Generally, the present invention is directed toward fluid processing using UV light that results in a high log reduction of microbes within the fluid while maintaining much of the nutritional and organoleptic properties, including color, smell and feel. This is beneficial in many contexts including making fluids safe for human consumption while maintaining the look, feel, taste, smell, and nutritional properties of said fluids. The method and system described herein is useful for wide application due to its ability to effectively reduce the presence of microbes with a relatively low level of exposure to UV light.

The present disclosure overcomes the disadvantages of the previously available systems and methods for processing fluid using ultraviolet light by utilizing a combination high turbulence and low diameter of fluid through the generation of thin fluid film or stream to reduce the overall overtreatment of the fluid to UV light as compared to prior methods. Overtreatment to UV light as discussed herein is the repeated exposure of a portion of fluid to ultraviolet radiation, often due to the inability of the ultraviolet radiation to penetrate the whole length of a fluid at one time. Additionally, some embodiments of the systems and methods described herein provide a system which processes the fluid between two surfaces which move in relation to one another, which provides a much more aggressive turbulence when compared with traditional hydraulic forces. This dramatically increases the ability to achieve a high log reduction of microbes in even dark process fluids. Some embodiments provide UV light to more than one side of a fluid at the same time, thus dramatically increasing the ability to achieve a high log reduction of microbes in even dark process fluids.

In some embodiments, the system for treatment of a process fluid using ultraviolet light includes a fluid inlet configured to provide fluid to an inner side of a wall, and a turbulence mechanism that rotates against the inner side of the wall to generate a thin film and high turbulence in the fluid. The turbulence mechanism may be a brush, wiper, second wall or other equivalent mechanism capable of generating a film on the inner side of the wall when the turbulence mechanism moves along the length of the inner side of the wall. In some embodiments, the system may further include an ultraviolet light source. The system may further be configured to generate a uniform film of fluid that moves diagonally across the inner side of the wall during the majority of the time the fluid moves along the inner side of the wall.

In some embodiments, the system for treatment of a process fluid using ultraviolet light includes a wall having an inner side, a fluid inlet pipe, at least one channel connected to the fluid inlet pipe configured to provide a fluid to the inner side of the wall, at least one length of brushes positioned parallel to the wall and configured to brush the inner side of the wall, and at least one ultraviolet lamp configured to come in visual contact with the fluid as it flows down the inner side of the wall. Each of the at least one channel may be communicated to the inner side of the wall to allow the fluid to flow onto the inner side of the wall. The at least one length of brushes may be configured to move along the inner side of the wall, brushing a fluid against the inner side of the wall and generating a film of fluid when fluid flows down the at least one channel. Some systems may further form a uniform film from the fluid during the majority of the fluid's time on the inner side of the wall.

In some embodiments, the system for treatment of a process fluid using ultraviolet light includes at least two cylinders, one inside the other, such that there is a gap between the walls of the cylinders. These cylinders may be arranged to allow fluid to flow in the gap between their walls, and may be configured to rotate in relation to one another. In some embodiments, the at least two cylinders would be configured to enclose a process fluid.

In some embodiments, the system for treatment of a process fluid using ultraviolet light includes a set of plates configured to allow fluid to flow between them configured to allow light to penetrate on two sides of a fluid at once when the fluid flows through the system and onto each of the set of plates.

Turning now to FIG. 1, there is provided a wall 102 to the system 100. An inlet pipe 104 may provide fluid to the system 100. At least one channel 106 may connect to the fluid inlet pipe 104 and may be configured to provide a fluid to the inner side of the wall 108. At least one length of brushes 110 may be positioned parallel to the wall 102 and may be configured to brush the inner side of the wall 108. At least one ultraviolet lamp 112 may be configured to come in visual contact with the fluid as it flows down the inner side of the wall 108.

In some embodiments, the wall 102 may form a cylinder. Other formations may also be used. The use of a cylinder may be preferable as the shape improves efficiency, creates a more uniform film, and reduces splashing. All of this may improve the system as it gives more control over where the fluid moves as well as better predicting how long any part of the fluid is exposed to ultraviolet light. In some embodiments, the wall 102 may be clear. In some embodiments, the wall 102 may be composed of a clear substance. In some embodiments, the wall 102 may be composed of glass, plexiglass, or clear plastic. These materials may aid in minimizing or preventing the formation of a mineral film or bio-film on the inner side of the wall 108. Other materials such as quartz or Teflon® may also be used, as the ultraviolet light meets the fluid before the wall, thus minimizing the effects of a film that may form on the surface of the inner side of the wall 108.

Still referring to FIG. 1, a gear box 114 may be used in connection with a motor 116 to move the at least one length of brushes 110 along the inner side of the wall 108. In some embodiments, a motor alone (not explicitly shown) may perform this function. In some embodiments, a five horsepower motor may perform this function, which may have a 7/1 gear ratio. The brushes 110 may spin around the inner side of the wall 108 in the case of a cylindrical wall.

In some embodiments, the cylindrical wall's accuracy may aid in controlling the film of fluid formed on the inner side of the wall 108. The cylindrical wall's radius may be true to about ⅛th of an inch or less. The accuracy of the radius may aid in generating consistent, uniform fluid film thickness as well as consistency in turbulence.

The support structure included in some embodiments will now be described while still referring primarily to FIG. 1. The support structure may include a central axis 118, a bottom assembly 120, and a spider with a bushing assembly 122. The at least one length of brushes 110 may be housed on the support structure by being bolted to the bottom assembly 120 which may be connected to the central axis 118. The spider and bushing assembly 122 may similarly stabilize the at least one length of brushes 110. In some embodiments, it may be preferable to have at least two lengths of brushes 110. In some embodiments, it may be preferable to arrange the at least one length of brushes 110 to balance weight distribution with regards to the central axis 118. Counterweights may be used to balance weight distribution with regards to the central axis in some embodiments. The motor 116 may rotate the central axis 118, which may rotate the brushes 110 around the inner side of the wall 108. The bushing assembly may comprise Teflon® blocks that may ride on a stainless race attached to an air duct 124. Other configurations may be used to rotate the brushes 110 along the inner side of the wall 108 as can be arranged by those knowledgeable in the pertinent art.

Figure 4:
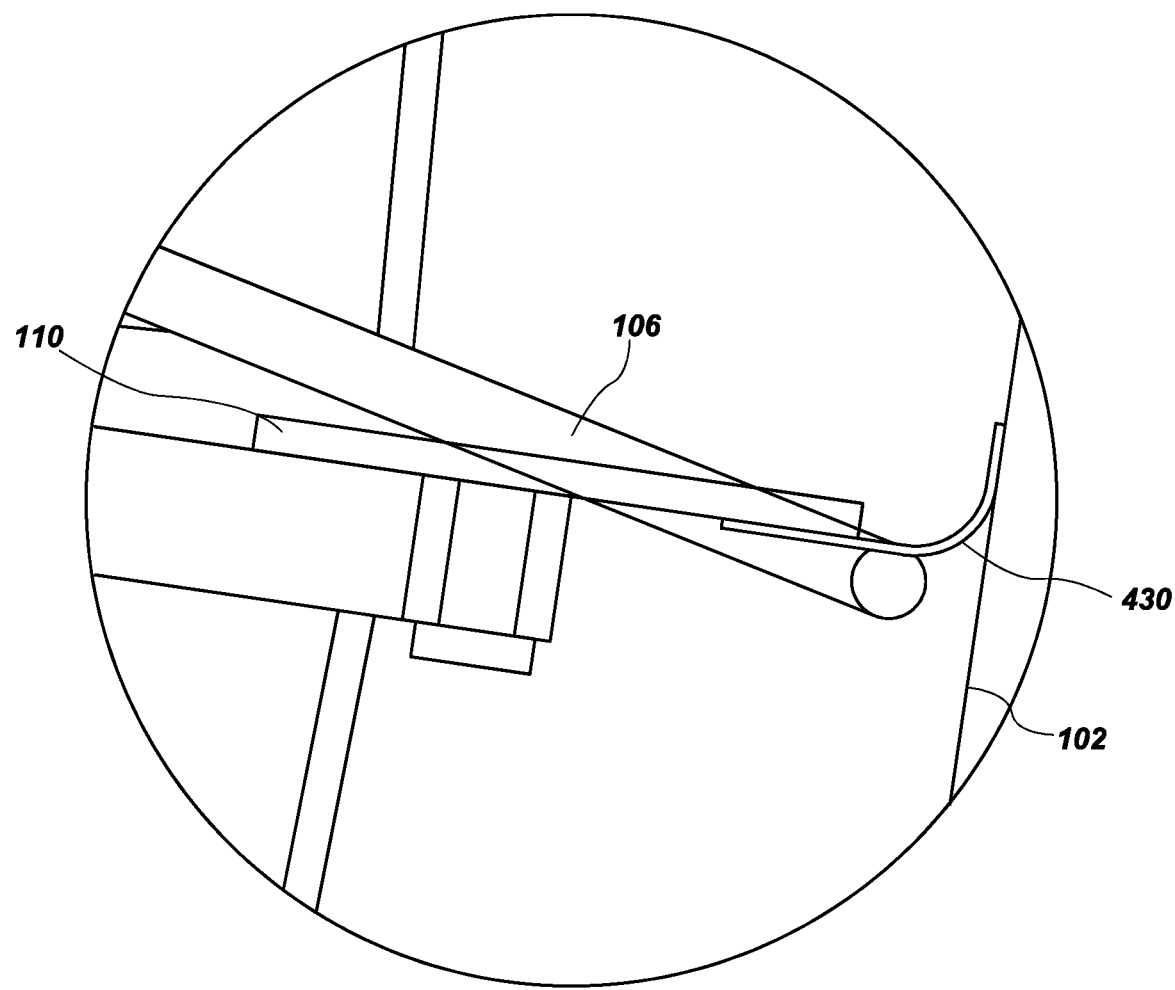
FIG. 4 is a view of the wall, channel, and length of brush as part of a system as disclosed herein.

In some embodiments, the at least one channel 106 may be connected to the support structure for the at least one length of brushes 110 such that the at least one channel 106 may be configured to allow fluid to flow in front of the at least one length of brushes 110 as shown by channel 106 in FIG. 4. The at least one channel 106 may be connected to the central axis 118 and may be configured to allow fluid to flow onto the inner side of the wall 108 directly in front of the at least two lengths of brushes 110. In some embodiments at least two channels 106a and 106b may be preferable. The number of channels may correspond to the number of lengths of brushes.

Returning now to FIG. 1, some embodiments may include a trough 126 that may be configured to connect the flow of fluid from the fluid inlet pipe 104 to the at least one channel 106. The trough may be connected to the central axis 118 and may spin with the at least one length of brushes 110. In some embodiments, the trough maybe configured to move with the at least one length of brushes 110.

In some embodiments, more than one fluid inlet pipe 104 may be used to direct flow into the system 100. In some embodiments, it may be preferable to have four or more channels and four or more lengths of brushes for the system. It may be further preferable to have at least sixteen channels and sixteen lengths of brushes in the system.

The number of channels and lengths of brushes may improve the system by aiding in minimizing the diameter of the film of fluid formed on the inner side of the wall of the system. The number of brushes may be optimized in accordance with the time the fluid film is exposed to ultraviolet light. The size of the system may also be a factor in determining the number of channels and lengths of brushes, as larger systems may allow for more channels and lengths of brushes. In some embodiments, there may be more lengths of brushes than there are channels. In some embodiments, the channels, and trough, if used, may remain stationary while the brushes turn along the inner side of the wall of the system. Different fluids may require different configurations of channels, lengths of brushes, and spinning capabilities due to the varying properties of the fluids that may be used according to the teachings of the present disclosure.

Figure 2:
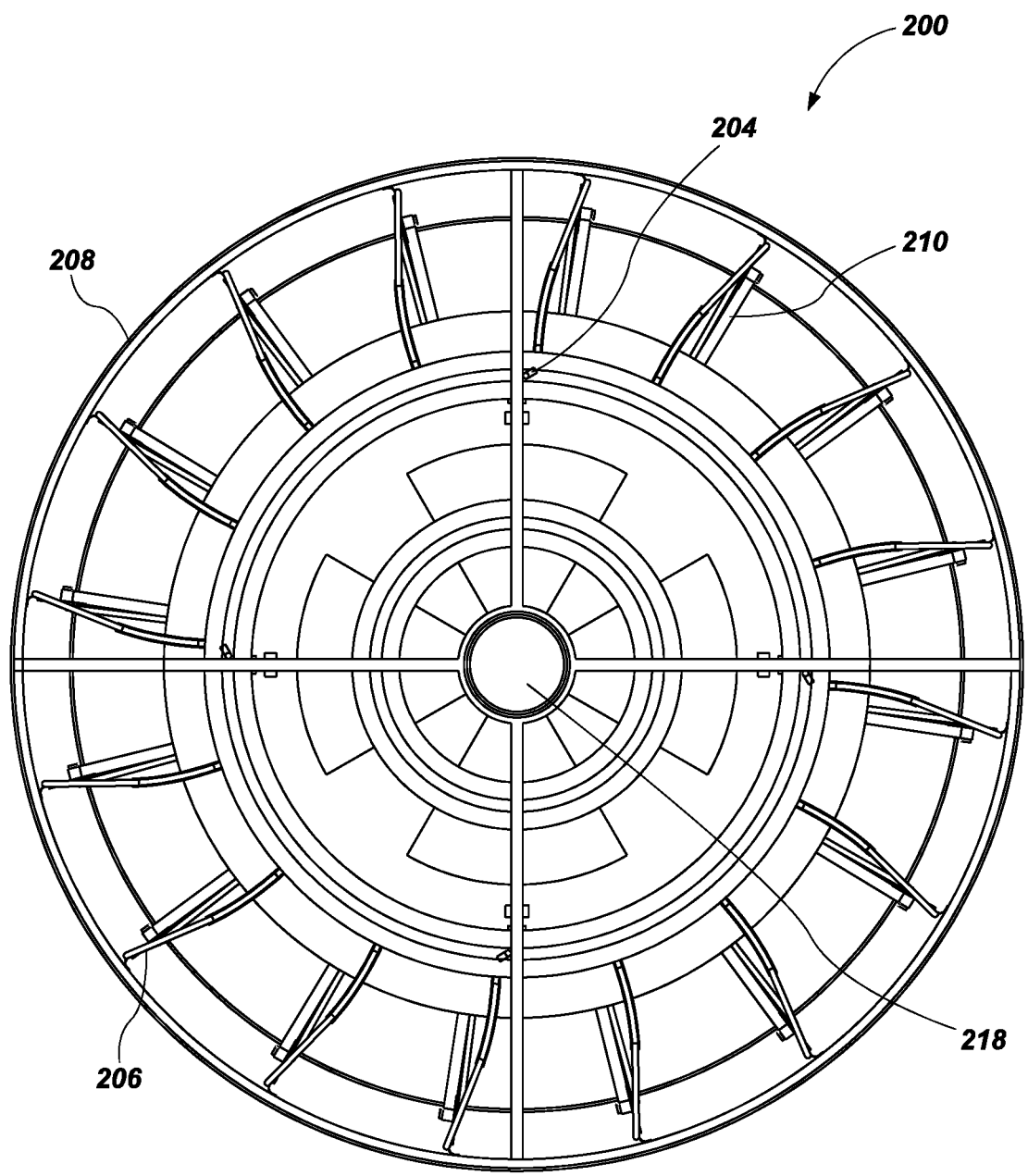
FIG. 2 is a top view of a system according to embodiments of the present disclosure.

As shown in FIG. 2, the at least one channel 206, may be configured to be in fixed positions equidistant from one another along the top portion of the inner side of the wall 208 in system 200. In some embodiments, the fluid inlet pipe 204 may be centrally located to fill the at least one channel 206 at relatively the same rate. In some embodiments, the at least one channel 206 may be configured to spin with the brushes and may be equidistant from one another along a central axis 218 so that the angle between each channel 206 is about the same. Similarly, when more than one length of brushes 210 is used, these brushes 210 may be located to be equidistant from one another as well.

Figure 3:
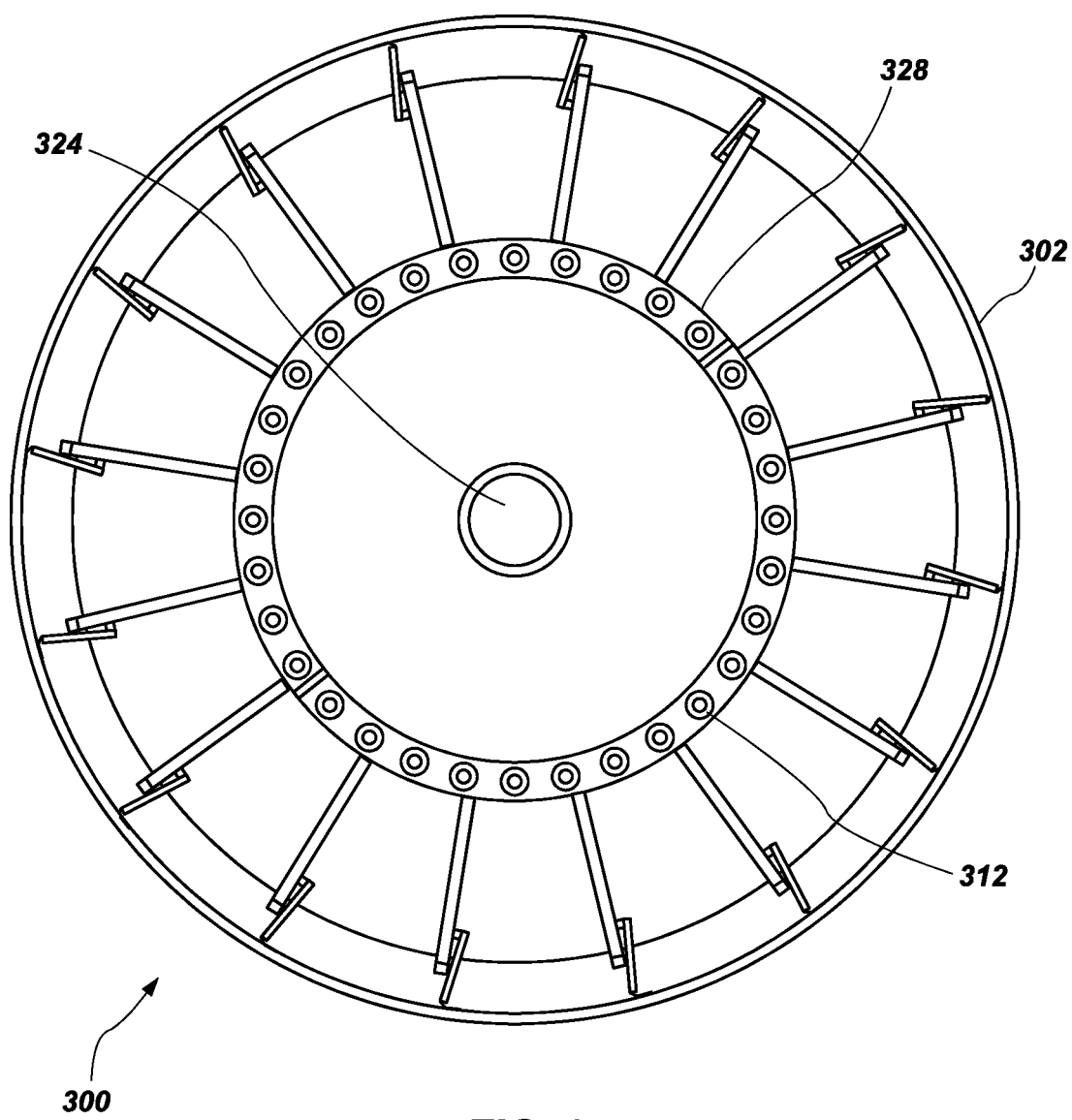
FIG. 3 is a top, cross sectional view of a system according to embodiments of the present disclosure.

Turning now to FIG. 3, the ultraviolet lamp 312 may be positioned inside the cylinder formed by the wall 302. In some embodiments, more than one ultraviolet lamp may be used. Depending on the size of the system 300, it may be advantageous to use more than ten ultraviolet lamps 312. Even more advantageous some systems may utilize thirty-two or more ultraviolet lamps 312. In some embodiments, ultraviolet lamps may be positioned both inside the cylinder and outside the cylinder, exposing the fluid to UV radiation from both the inner and outer sides of the cylinder (not shown). Those knowledgeable in the pertinent art will readily arrive at the particular ultraviolet lamps considering the output power, wavelength and other pertinent factors.

In some embodiments, the ultraviolet lamps may operate at a temperature between 175 and 225 degrees Fahrenheit. It may be preferred to operate at a temperature of about 190 to 210 degrees Fahrenheit. An air duct 324 may aid in maintaining an optimum temperature of the ultraviolet lamps. The air duct 324 may additionally provide structural support for the ultraviolet lamps 312 house inside the wall 302. Other methods of cooling ultraviolet lams 312 may be used as known in the art. Some embodiments may utilize low pressure mercury lights as the ultraviolet lamps. The inclusion of more lights may improve performance of the system.

As best illustrated in FIG. 3, the at least one ultraviolet lamp 312 may be protected from fluid splashing by a second wall 328 configured to be inside the wall 302. The second wall may be clear, to allow the passage of ultraviolet light through it and to the fluid. The second wall 328 may further be configured to not come in contact with the fluid when it forms a film on the inner side of the wall 302.

As shown best in FIG. 4, the at least one length of brushes 110 may be configured to have bristles 430. These bristles 430 may be configured to brush against the inner side of the wall 102, generating a film of fluid along the majority of the inner side of the wall 102. In some embodiments, the fluid formed by the length of brushes 110 may be less than 0.1 millimeters in width as the film flows down the majority of the inner side of the wall 102. In some embodiments, a larger width such as between 0.1 and 1 millimeter may be used with success. In some embodiments, larger fluid thicknesses as much as 3 millimeters or more may be useful. The width of the fluid film may vary based on different configurations embodied in the present invention and may also vary based on the fluid used in the practice of the invention. Fluid thickness is important as it affects how much of the fluid is exposed to UV light at one time. The penetration zone is the portion of the fluid thickness that is exposed to UV light before the color and particles in a fluid block the light, preventing inactivation of organisms. Fluids that are darker or have more light blocking particles typically have a smaller penetration zone as light cannot penetrate but the first portion of the fluid thickness. A thinner fluid thickness during treatment allows for a penetration zone that is a larger proportion of the fluid thickness. By way of example only, if a penetration zone is 0.01 millimeters for a fluid, then a film thickness of 0.1 millimeters allows for 10% of the fluid to be exposed to UV light at a time whereas a film thickness of 1 millimeter allows a mere 1% of the same fluid to be exposed to UV light. Furthermore, turbulence is used to mix the fluid, allowing new portions of the fluid to be exposed to the light as the fluid moves through the system, as different parts of the fluid will move into the penetration zone as the fluid is moved along the inner side of the wall 102. Overtreatment of the fluid, as discussed above, occurs when parts of a fluid are re-exposed to UV light, often occurring when treated fluid leaves and then re-enters the penetration zone. Overtreatment of the fluid is greatly reduced when the penetration zone is a larger proportion of the fluid's thickness. When a larger portion of a fluid is exposed to UV radiation at any time, less turbulence is needed to expose most or nearly all portions of the fluid to UV radiation, which reduces the amount of fluid that is re-exposed to UV radiation in the process. Reduced overtreatment leads to less organoleptic and nutritional degradation of a fluid. High log reduction of microbes is achieved when a large portion of the fluid is exposed to UV light during the course of treatment. Therefore, the system simultaneously exposes a larger portion of the fluid to UV light while minimizing overtreatment of the fluid by reducing fluid film thickness while generating a high level of fluid turbulence. In some embodiments, the at least one length of brushes 110 may be comprised of Teflon®. In some embodiments, other materials may be used, with materials that can withstand UV light without degrading being preferred.

Figure 5:
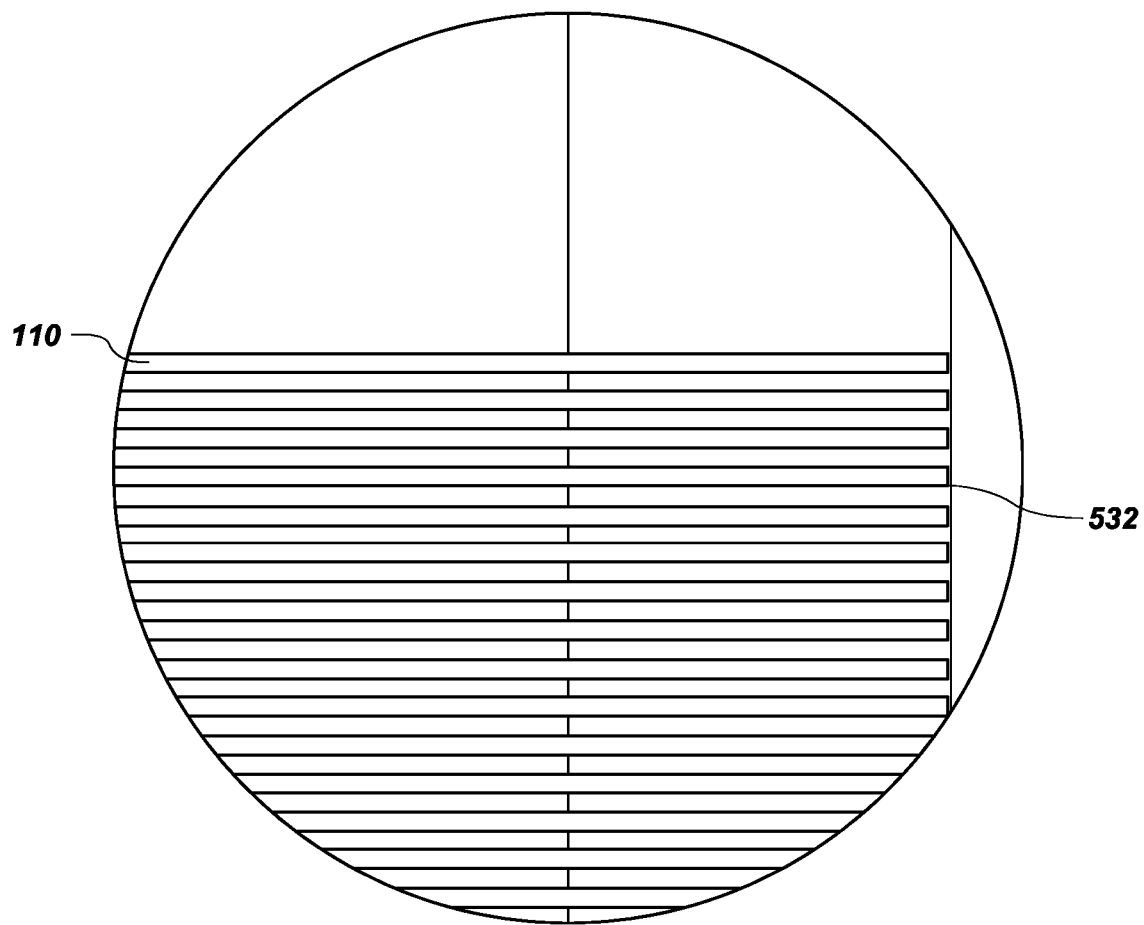
FIG. 5 is a view of a length of brush as part of a system disclosed herein.

As shown in FIG. 5, the at least one length of brushes 110 may further comprise bristles 532. In some embodiments, the bristles may be configured to be between 0.02 and 0.03 inches apart from one another. In some embodiments, the bristles may be between 0.015 and 0.03 inches in diameter. In some embodiments, the bristles may be between about 0.5 and 1.5 inches long. It may also be preferred to have bristles about 1 inch long. It may further be preferred to have bristles between about 0.020 and about 0.028 inches in diameter. It may further be preferred to have bristles about 0.025 inches apart.

Figure 6:
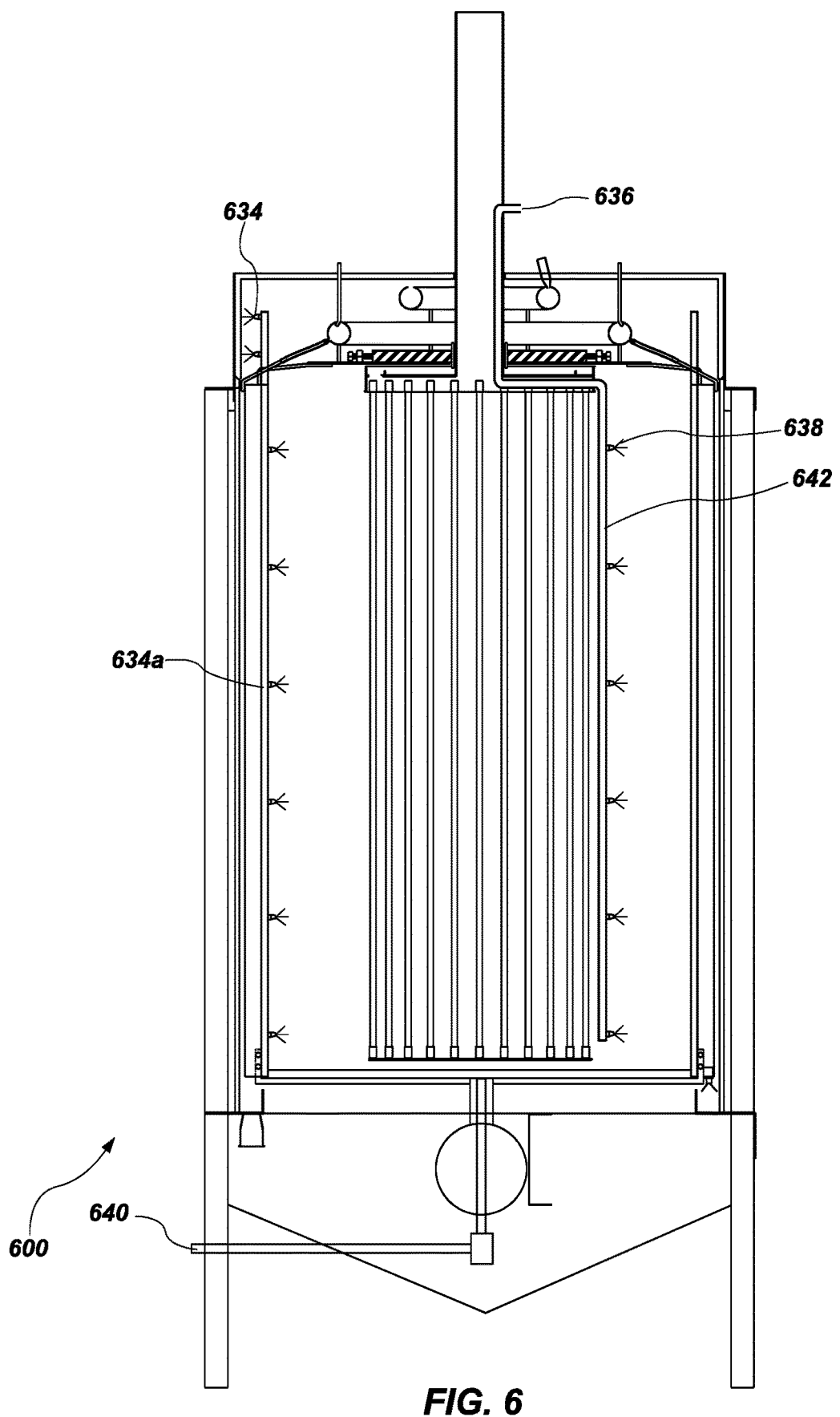
FIG. 6 is a view of systems according to embodiments of the present disclosure.

As shown in FIG. 6, some embodiments may further comprise at least one spray nozzle 638. In some embodiments, the at least one spray nozzle 638 may be configured to spray the turbulence mechanism. In some embodiments, the at least one spray nozzle 638 may be configured to clean the at least one length of brushes 110. The at least one spray nozzle 638 may further be configured to spray a cleaning fluid on turbulence mechanism for cleaning purposes. In some embodiments, the at least one spray nozzle 638 may be configured to spray the at least one length of brushes 110 clean from debris left by process fluid.

In some embodiments, it may be preferable to have more than one spray nozzle 638. In some embodiments it may be preferable to have nozzles arranged in sets. In some embodiments it may be preferred to have between 1 and 100 spray nozzles. In some embodiments, it may be even more preferred to have between 5-10 sets of nozzles. The preferred number of spray nozzles may vary depending on fluid properties and system size. The at least one spray nozzle 638 may be configured to spray the full length of the at least one length of brushes 110.

In some embodiments, the at least one spray nozzle 638 may be configured to be stationary, and the system 100 may be configured to spin the at least one length of brushes 110 around the central axis 118 for cleaning. In some embodiments, both the at least one spray nozzle 634 and at least one spray nozzle 634a may be configured to rotate in order to facilitate cleaning of the system 600, including the inner side of the wall 108, as shown in FIG. 1 and the second wall 328, as shown in FIG. 3. In some embodiments, the at least one spray nozzle 638 and the at least one length of brushes 110 may be configured to remain stationary during cleaning. In some embodiments, a second at least one spray nozzle 634 may be configured to be used in tandem with the at least one spray nozzle 638. In some embodiments, there may be stationary and rotating spray nozzles.

In some embodiments, at least one spray nozzle 638 may be configured to be placed such that it sprays at the at least one length of brushes 110. This may be from an outer or an inner location in the system 100, including on the second, inner wall 328 or on the inner side of the wall 108. As represented in FIG. 6, a drive mechanism is positioned at the bottom of the structure.

A first port 636 may allow for the entry of cleaning fluid into the system 100. The system 100 may further comprise at least one duct 642 connected to the port 636 and the at least one spray nozzle 638 such that the system 100 is configured to allow cleaning fluid to flow from the inlet 636 to the at least one spray nozzle 638. The system 100 may further comprise a second port 640 configured to allow fluid move through the system 100 during cleaning.

Figure 7:
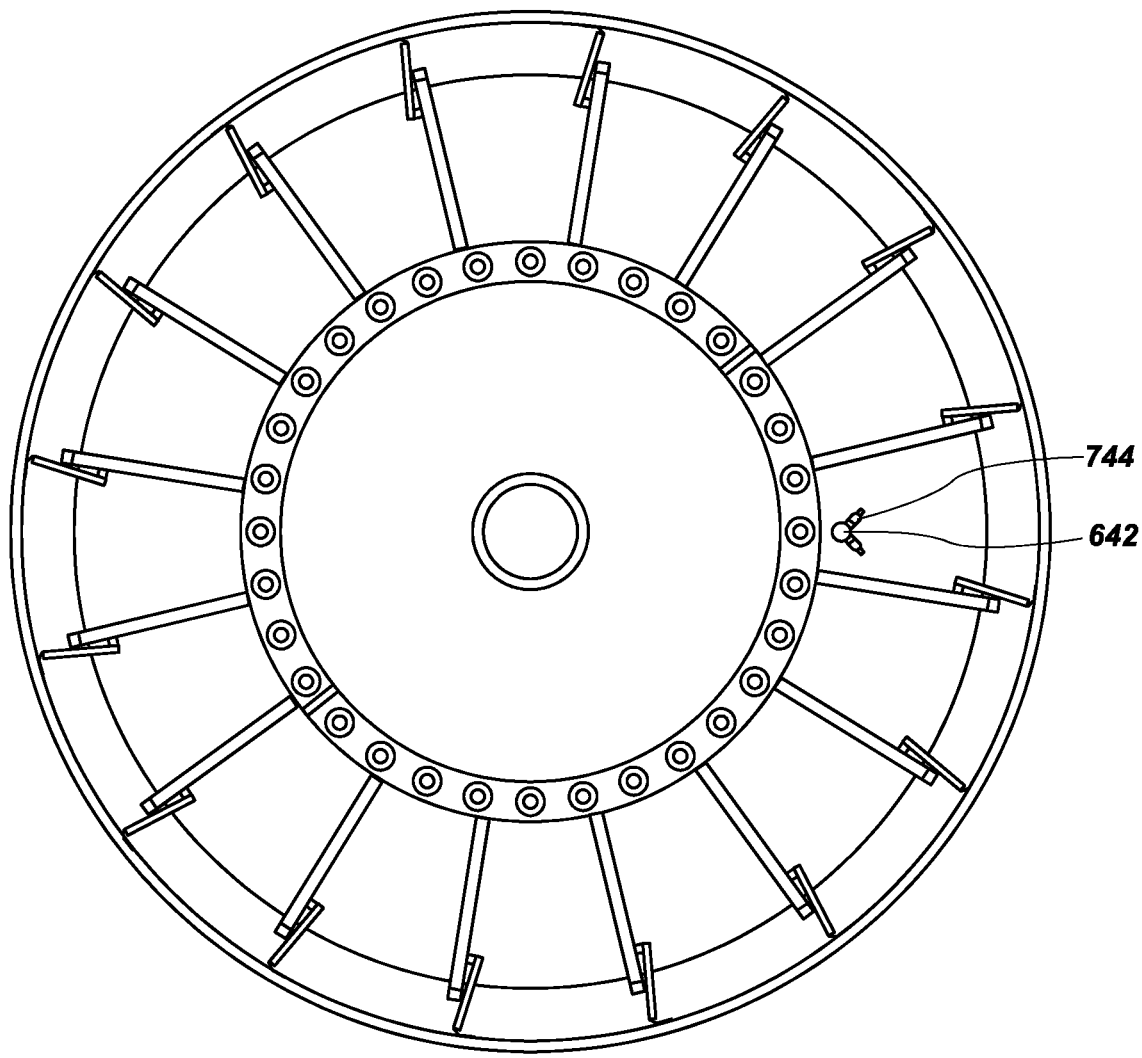
FIG. 7 is a view of nozzles as part of a system as disclosed herein.

As shown in FIG. 7, the at least one spray nozzle may comprise at least one set of spray nozzles 744 connected to the at least one duct 642 and may be placed in the system 100 such that it is configured to spray cleaning fluid on the at least one length of brushes 110 at an angle. In some embodiments, the angle of the at least one set of spray nozzles may be about 45 degrees from a wall. In some embodiments, angles between 30 and 60 degrees may be used. In some embodiments, each one of the pair of spray nozzles in the at least one set of spray nozzles 744 may be configured to be approximately 90 degrees from one another. In some embodiments, angle between the at least one set of spray nozzles 744 may be between 50 and 150 degrees. In some embodiments, the at least one set of spray nozzles 744 may be configured to spray both sides of the at least one length of brushes 110.

In some embodiments, the at least one spray nozzle 638, at least one duct 642, inlet 636, at least one spray nozzle 634 and at least one spray nozzle 634a are removable from the system. In some embodiments, the at least one spray nozzle 638, at least one duct 642, inlet 636, at least one spray nozzle 634, and at least one spray nozzle 634a remain in place during process fluid processing.

Figure 8:
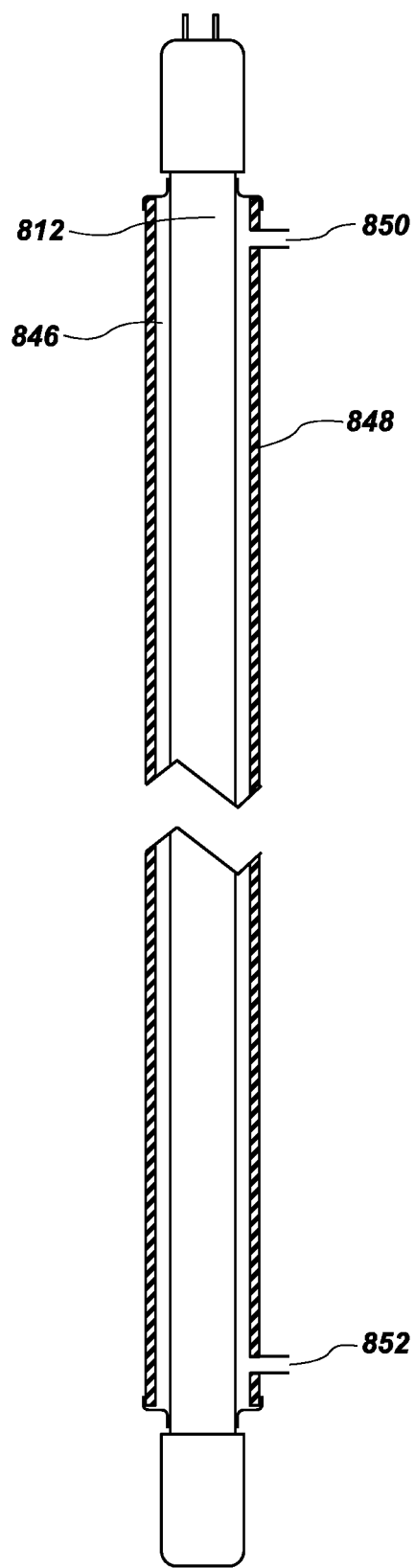
FIG. 8 is a view of a cooling UV system according to embodiments of the present disclosure.

Referring now to FIG. 8, the ultraviolet lamp 812 may be surrounded by a cooling fluid 846. The cooling fluid 846 may be encased around ultraviolet lamp 812 by an enclosure 848. The enclosure 848 may be made of quartz, Teflon®, or other substance capable of holding in the cooling fluid 846 while allowing ultraviolet light through. In some embodiments, the enclosure 848 allows cooling fluid to flow in and out of the system, via cooling inlet 850 and cooling outlet 852, cooling the ultraviolet lamps. In some embodiments, the cooling fluid 846 may be water, deionized water, oils, solvents or other material that does not leave deposits on the ultraviolet lamp 812 and allows ultraviolet light to pass through. In some embodiments, the cooling fluid is preferred over air as the cooling fluid also removes particles or dust from the ultraviolet lamp 812 as it passes over ultraviolet lamp 812, thus keeping the maximum ultraviolet light present in the system 100.

Figure 9:
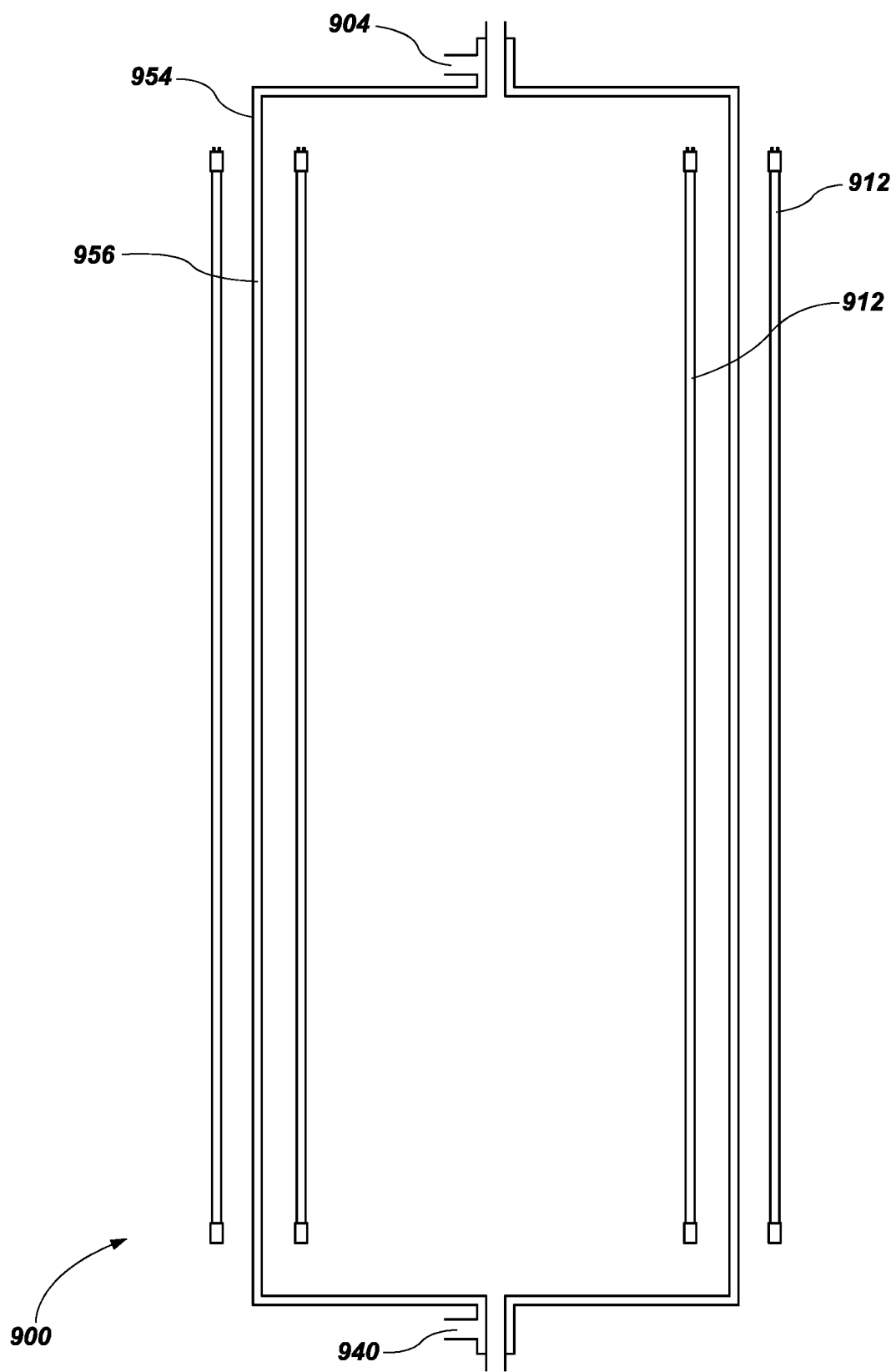
FIG. 9 is a view of a system according to embodiments of the present disclosure.

Referring now to FIG. 9, in some embodiments, the system 900 may comprise an outer cylinder 954 and an inner cylinder 956. The outer cylinder 954 and inner cylinder 956 may be configured to rotate in relation to one another such that a fluid placed between them is enclosed and very thin. In some embodiments, the cylinders 954 and 956 may be configured to generate process fluid thicknesses between about 0.010 inches to about more than 1.0 inches. Different thicknesses within this range may be preferable depending on the darkness and penetration of ultraviolet light possible in the process fluid. In some embodiments, one cylinder may be configured to be stationary while the other was configured to rotate. This rotation would generate a very turbulent fluid with high, fast exposure to at least one ultraviolet lamp 912. The at least one ultraviolet lamp 912 may be placed inside the inner cylinder 956. In some embodiments the at least one ultraviolet lamp 912 may be outside the outer cylinder 954. In some embodiments, the at least one ultraviolet lamp 912 may be both inside the inner cylinder 956 and outside the outer cylinder 954.

The inner cylinder 956 and outer cylinder 954 may be made of a material that lets a large portion of ultraviolet light pass through it. Such materials may include quartz, Teflon®, and equivalent materials that block minimal ultraviolet light.

The system 900 may further comprise an fluid inlet pipe 904 configured to allow fluid to enter the space between the inner cylinder 956 and the outer cylinder 954. The system may also have an outlet 940.

In some embodiments, the surfaces of inner cylinder 956 and outer cylinder 954 may be smooth. In some embodiments, the surfaces of inner cylinder 956 and outer cylinder 954 may be rough to increase turbulence in the process fluid.

The speed of rotation of the cylinders in relation to one another may vary depending on the properties of the process fluid, including such properties as viscosity and fluid thickness as it travels between the cylinders. In some embodiments, the speed of rotation may be preferred to be between about 5 and 50 feet per second.

Embodiments involving enclosed systems may have the advantages of not exposing process fluids to air, thus avoiding airborne contaminants as well as oxidation of the process fluids. Embodiments with high turbulence and thin film provide very good exposure to ultraviolet light, even for darker fluids that do not let in much light.

Figure 10:
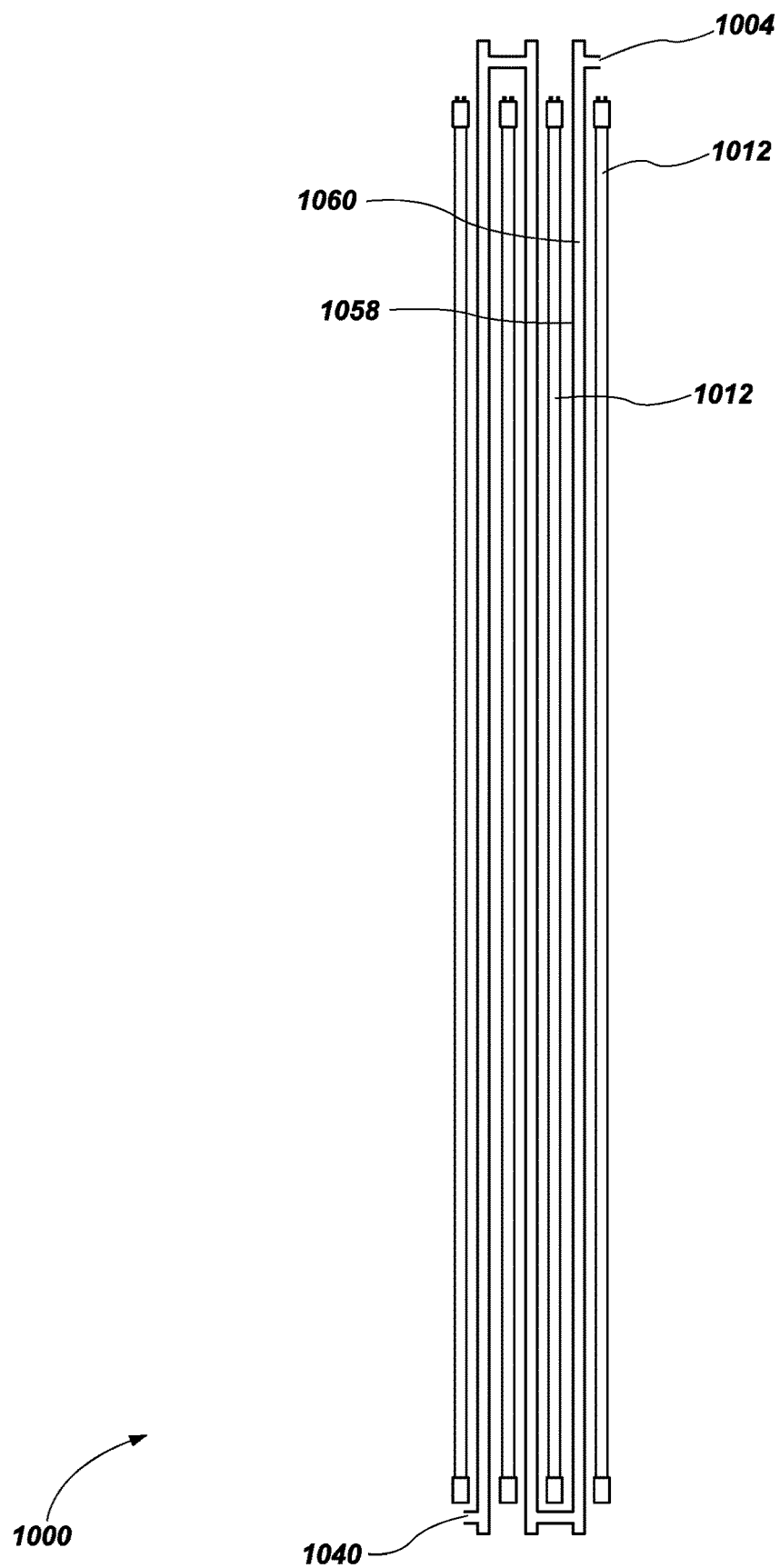
FIG. 10 is a view of a system according to embodiments of the present disclosure.

As shown in FIG. 10, some embodiments may comprise a system of plates 1058 configured to overlap as shown such that the space between plates forms a fluid flow channel 1060 that is configured to expose a process fluid to ultraviolet lamps 1012 on either side of the formed fluid flow as the process fluid flows through the system 1000. An inlet 1004 may be configured to allow process fluid to enter the system 1000. An outlet 1040 may be configured to allow process fluid to exit the system 1000. In some embodiments the plates 1058 may be arranged in a series flow such that the plates 1058 are configured to flow fluid from the top of a first plate to the bottom of said first plate into the top of a at least a second plate. In some embodiments, a parallel fluid flow may be used such that the system is configured to flow fluid both in a downward direction for multiple plates and in an upward direction for multiple plates. Preferred embodiments may vary between configurations, size and length of flow, based on process fluid properties including viscosity, turbidity, and needed ultraviolet exposure dwell times.

Advantages of systems with plates include ease of cleaning and the above explained advantages. Such systems do not comprise moving parts during fluid flow, and are thus lower in maintenance. Such systems may also have the advantage of comprising a smaller footprint do to overlapping fluid flow, thus decreasing cost as well.

Figure 11:
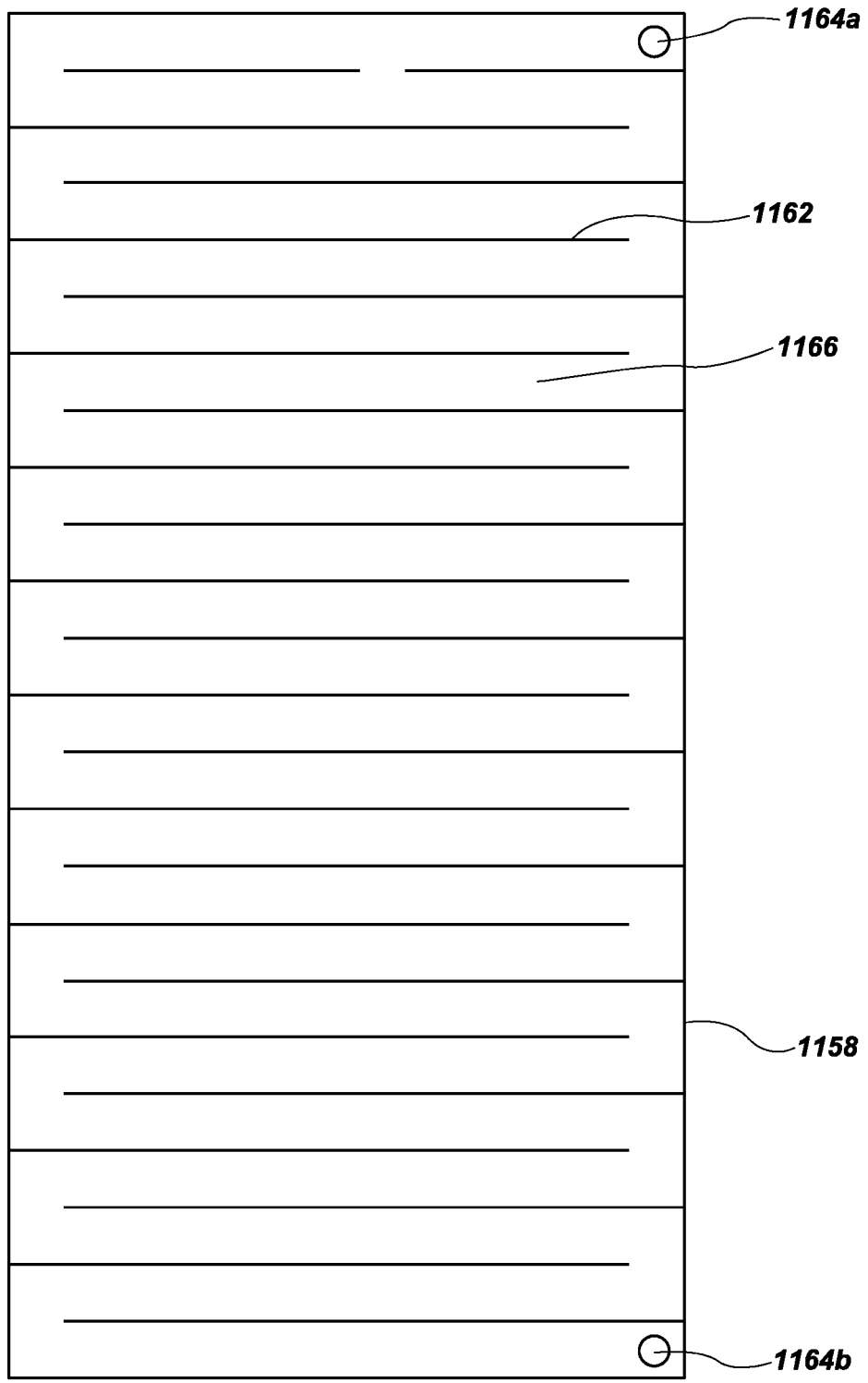
FIG. 11 is a view of a system according to embodiments of the present disclosure.

As shown in FIG. 11, the plates 1158 may further comprise a gasket material that extends into the plate and is configured to lengthen out the path for the process fluid to travel, thus decreasing flow rates and increasing dwell time. Embodiments with gaskets 1162 may be optimized for the properties of the process fluid, including viscosity, turbidity, and needed ultraviolet exposure dwell times. The plates 1158 may have at least two ports 1164a and 1164b where fluid may enter and exit. Such ports may serve as an inlet or outlet depending on desired fluid flow.

The gasket thickness 1166 may be configured to determine the thickness of the process fluid as it flows through system 1000. In some embodiments, the gasket thickness 1166 may be between about 0.010 inches and about more than 1.0 inches. Such preferred thickness may vary based on process fluid properties including viscosity and turbidity.

A method for treatment of a process fluid using ultraviolet light is also disclosed. The method may include the steps of providing a wall having an inner side; providing a fluid to the inner side of the wall by way of an inlet pipe connected to at least one channel; brushing the fluid against the inner side of the wall with at least one length of brushes to generate a fluid film along the inner side of the wall; and providing at least one ultraviolet light near the wall such that the ultraviolet light is configured to be in visual contact with the fluid as it is brushed against the inner side of the wall, wherein the at least one channel is configured to provide fluid the inner side of the wall such that the fluid flows down the inner side of the wall and wherein the at least one length of brushes is positioned parallel to the longitudinal side of the wall. The method may further comprise moving at least one length of brushes along the inner side of the wall using a motor.

In some embodiments, the steps may include the step of moving the at least one channel along the wall in front of the brushing such that the fluid is provided to the inner side of the wall in front of the at least one length of brushes. Some embodiments may further include the step of providing the fluid to the to the at least one channel by way of a trough configured to collect fluid from the inlet pipe. The trough may be configured to move with the at least one length of brushes or may be configured to remain stationary like the wall. In some embodiments, at least two channels may be used and may be configured to be equidistant from one another along the upper portion of the inner wall. The at least one channel may move with the at least one length of brushes or may remain stationary with the wall.

In some embodiments, the fluid film is uniform during the majority of the fluid's time on the inner side of the wall. The fluid film produced according to the method may be less than 0.1 millimeters in width.

In some embodiments, the at least one ultraviolet light may be protected from the fluid by a second wall. The wall and second wall may be composed of a clear substance.

In some embodiments, the wall may form a cylinder. In such embodiments, the at least one ultraviolet light may be positioned inside the cylinder. The method may further comprise, when the wall forms a cylinder, spinning the at least one length of brushes along the inner side of the wall using a motor. The at least one length of brushes may be attached to a central axis that turns by way of the motor.

In some embodiments, the at least one length of brushes comprises at least two lengths of brushes, and in some cases, the at least two lengths of brushes may be provided equidistant from one another along the inner side of the wall. The at least one length of brushes may further comprises bristles. In some embodiments, the bristles may be configured to be between 0.015 and 0.03 inches in diameter and between 0.02 and 0.03 inches apart from one another.

In view of the foregoing, a system and method for treatment of a process fluid using ultraviolet light was described utilizing rotating brushes. These rotating brushes create more turbulence, more treatment surface area and more film uniformity. Also provided herein are methods and systems to generate a very thin film of fluid which is useful in minimizing the overtreatment to UV light needed to generate a high log reduction of microbes in fluids, especially dark fluids and fluids that do not allow much light to transfer through them.

In view of the foregoing, it will be appreciated that the features and descriptions of the system may be utilized by the method and vice versa. The disclosure is not to be interpreted as being limited by the features described only as a system or as a method, but can be interchanged as feasible.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of any single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in quantities, proportions, materials, and manner of making and use may be made without departing from the principles and concepts set forth herein.

What is claimed is:

1. A system for treatment of a process fluid using ultraviolet light comprising:
   a fluid inlet configured to provide fluid to an inner side of a wall of a system;
   a turbulence mechanism configured to move along the inner side of the wall, generating a thin film with fluid thickness of less than 1 mm; and
   an ultraviolet lamp.

2. The system of claim 1, wherein the turbulence mechanism may comprise at least two plates.

3. The system of claim 2, wherein the at least two plates may be configured to generate an electromagnetic signal in the ultraviolet range.

4. A system for treatment of a process fluid using ultraviolet light comprising:
   a source of ultraviolet light;
   a fluid inlet configured to provide fluid to an inner side of a wall; and
   a turbulence mechanism configured to rotate along the inner side of the wall; wherein the turbulence mechanism is configured to generate a thin film of fluid along the inner side of the wall, wherein the thin film of fluid generated has a thickness which is smaller than the thickness of the turbulence mechanism; and
   wherein the thin film of fluid is generated on the inner side of the wall and wherein an inner side of the thin film of fluid is exposed to the air and not confined by an additional wall;
   wherein the source of ultraviolet light illuminates the thin film of fluid with ultraviolet light.

5. The system of claim 4, wherein the turbulence mechanism is further configured to generate high turbulence in the fluid.

6. The system of claim 4, wherein the turbulence mechanism may be comprised of at least one of: a brush, wiper, or a second wall.

7. The system of claim 4, wherein the system is further configured to generate a uniform film of fluid that moves diagonally across the inner side of the wall during the majority of the time the fluid moves along the inner side of the wall.

8. A system for treatment of a process fluid using ultraviolet light comprising:
   a wall having an inner side;
   a fluid inlet pipe;

at least one channel connected to the fluid inlet pipe and configured to provide a fluid to the inner side of the wall;

at least one length of brushes positioned parallel to the wall and configured to brush the inner side of the wall;

at least one ultraviolet lamp configured to come in visual contact with the fluid as it flows down the inner side of the wall;

wherein each of the of the at least one channel is communicated to the inner side of the wall to allow the fluid to flow onto the inner side of the wall; and, wherein the at least one length of brushes is configured to move along the inner side of the wall, brushing the fluid flowing down the at least one channel to the inner side of the wall against the inner side of the wall generating a film of fluid less than 1 mm thick on the inner side of the wall.

9. The system of claim 8, wherein the fluid forms a uniform film during of the majority of the fluid's time on the inner side of the wall.

10. The system of claim 9, wherein the film is less than 0.1 millimeters in width as the film flows down the majority of the inner side of the wall.

11. The system of claim 8, wherein the wall forms a cylinder.

12. The system of claim 8, wherein the wall is composed of a clear substance.

13. The system of claim 12, wherein the at least one length of brushes spin around the inner side of the wall.

14. The system of claim 12, wherein the wall having an inner side forms a cylinder and wherein at least one ultraviolet lamp is positioned inside the cylinder formed by the wall.

15. The system of claim 14, wherein the at least one ultraviolet lamp is protected from fluid splashing by a second wall configured to be inside the wall.

16. The system of claim 12, wherein the at least one length of brushes comprise at least two lengths of brushes positioned equidistant from one another.

17. The system of claim 16, wherein the at least two lengths of brushes are connected to a central axis that turns by way of a motor.

18. The system of claim 17, wherein the at least one channel is connected to the central axis and are configured to allow fluid to flow onto the inner side of the wall directly in front of each of the at least two lengths of brushes.

19. The system of claim 8, wherein the wall is composed of glass, plexiglass or clear plastic.

20. The system of claim 8, further comprising a motor configured to move the at least one length of brushes.

21. The system of claim 8, wherein the at least one channel is connected to a support structure for the at least one length of brushes such that the at least one channel is configured to allow fluid to flow in front of the at least one length of brushes.

22. The system of claim 8, further comprising a trough that is configured to connect the flow of fluid from the fluid inlet pipe to the at least one channel.

23. The system of claim 22, wherein the trough is configured to move with the at least one length of brushes.

24. The system of claim 8, wherein the at least one channel is configured to be in fixed positions equidistant from one another along the top portion of the inner side of the wall.

25. The system of claim 8, wherein the at least one length of brushes are comprised of polytetrafluoroethylene.

26. The system of claim 8, wherein the at least one length of brushes further comprises multiple bristles.

27. The system of claim 26, wherein the bristles are configured to be between 0.02 and 0.03 inches apart from one another.

28. The system of claim 26, wherein the bristles are between 0.015 and 0.03 inches in diameter.

29. A method for treatment of a process fluid using ultraviolet light comprising:

providing a wall having an inner side;

providing a fluid to the inner side of the wall by way of an inlet pipe connected to at least one channel;

brushing the fluid against the inner side of the wall with at least one length of brushes, generating a thin fluid film less than 1 mm thick along the inner side of the wall;

providing at least one ultraviolet light near the wall such that the ultraviolet light is configured to be in visual contact with the fluid as it is brushed against the inner side of the wall;

wherein the at least one channel is configured to provide fluid to the inner side of the wall such that the fluid flows down the inner side of the wall; and, wherein the at least one length of brushes is positioned parallel to the longitudinal side of the wall;

wherein the thin film of fluid generated has a thickness which is smaller than the length of the brushes; and wherein the thin film of fluid is generated on the inner side of the wall and wherein an inner side of the thin film of fluid is exposed to the air and not directed by an inner wall.

30. The method of claim 29, wherein the fluid film is uniform during the majority of the fluid's time on the inner side of the wall.

31. The method of claim 29, wherein the wall forms a cylinder.

32. The method of claim 31, wherein the at least one ultraviolet light is positioned inside the cylinder.

33. The method of claim 29, wherein the wall is composed of a clear substance.

34. The method of claim 29, wherein the fluid film is less than 0.1 millimeters in width.

35. The method of claim 29, the method further comprising moving at least one length of brushes along the inner side of the wall using a motor.

36. The method of claim 29, wherein the at least one ultraviolet light is protected from the fluid by a second wall.

37. The method of claim 29, the method further comprising spinning the at least one length of brushes along the inner side of the wall using a motor.

38. The method of claim 37, wherein the at least one length of brushes is attached to a central axis that turns by way of the motor.

39. The method of claim 29, the method further comprising moving the at least one channel along the wall in front of the brushes such that the fluid is provided to the inner side of the wall in front of the at least one length of brushes.

40. The method of claim 39, further comprising providing the fluid to the at least one channel by way of a trough configured to collect fluid from the inlet pipe.

41. The method of claim 40, wherein the trough is configured to move with the at least one length of brushes.

42. The method of claim 29, wherein the at least one length of brushes comprises at least two lengths of brushes.

43. The method of claim 42, wherein the at least two lengths of brushes are provided equidistant from one another along the inner side of the wall.

44. The method of claim 42, wherein the bristles are configured to be between 0.015 and 0.03 inches in diameter and between 0.02 and 0.03 inches apart from one another.

45. The method of claim 29, wherein the at least one channel are configured to be equidistant from one another along the upper portion of the inner wall.

46. The method of claim 29, wherein the at least one length of brushes further comprises bristles forming the at least one length of brushes.

47. A system for treatment of a process fluid using ultraviolet light comprising:
   a wall having an inner side;
   a fluid inlet pipe;
   at least one channel connected to the fluid inlet pipe and configured to provide a fluid to the inner side of the wall;
   at least one length of brushes positioned parallel to the wall and configured to brush the inner side of the wall;
   at least one ultraviolet lamp configured to come in visual contact with the fluid as it flows down the inner side of the wall;
   at least one spray nozzle;
   wherein each of the of the at least one channel is communicated to the inner side of the wall to allow the fluid to flow onto the inner side of the wall;
   wherein the at least one length of brushes is configured to move along the inner side of the wall, brushing the fluid flowing down the at least one channel to the inner side of the wall against the inner side of the wall generating a film of fluid less than 1 mm thick on the inner side of the wall; and
   wherein the at least one spray nozzle is configured to clean debris from the system.

48. The system of claim 47, wherein the at least one spray nozzle comprises at least one set of two spray nozzles.

49. The system of claim 48, wherein the at least one set of two spray nozzles may be placed on the inner side of the wall about 45 degrees from the inner side of the wall.

50. The system of claim 49, wherein each of the at least one set of two spray nozzles may be placed such that they are configured to be approximately 90 degrees from one another.

51. The system of claim 47, wherein the at least one spray nozzle is configured to spray the full length of the at least one length of brushes.

52. The system of claim 47, wherein the at least one spray nozzle is configured to clean debris left by the fluid.

53. The system of claim 47, wherein the at least one spray nozzle comprises between about 5 and 10 sets of two spray nozzles.

54. The system of claim 47, wherein the system is configured to rotate the at least one length of brushes around a central axis of the system to facilitate cleaning debris from the at least one length of brushes.

55. The system of claim 54, wherein the at least one spray nozzle is configured to be stationary while the at least one length of brushes rotates in order to facilitate cleaning debris from the at least one length of brushes.

56. The system of claim 47, the system further comprising a second at least one spray nozzle configured to be used in tandem with the at least one spray nozzle.

57. The system of claim 56, wherein the at least one spray nozzle is configured to remain stationary and the second at least one spray nozzle is configured to rotate within the system.

58. The system of claim 47, wherein the at least one spray nozzle is configured to spray the at least one length of brushes from the inner side of the wall.

59. The system of claim 47, wherein the at least one ultraviolet lamp is configured to be located behind a second inner wall and wherein the at least one spray nozzle is on the second inner wall and is configured to spray the at least one length of brushes.

60. The system of claim 47, the system further comprising a first port configured to allow for the entry of cleaning fluid into the system and at least one duct connected to the first port and the at least one spray nozzle such that the system is configured to allow cleaning fluid to flow from the first port to the at least one spray nozzle.

61. The system of claim 60, wherein the at least one spray nozzle, first port, and at least one duct are configured to be removable from the system such that they are present during cleaning of the system and absent from the system during fluid processing by the system.

62. The system of claim 60, wherein the at least one spray nozzle, first port, and at least one duct are configured to remain within the system during cleaning and during fluid processing by the system.

63. The system of claim 47, wherein the at least one ultraviolet lamp may be encased by an enclosure configured to allow cooling fluid to surround the at least one ultraviolet lamp.

64. The system of claim 63, wherein the enclosure allows cooling fluid to flow in and out of the system to provide consistent cooling for the at least one ultraviolet lamp.

65. The system of claim 63, wherein the cooling fluid comprises a fluid that allows ultraviolet light to pass through.

66. The system of claim 63, wherein the cooling fluid may be at least one of water, deionized water, oil, and a solvent.

67. The system of claim 63, wherein the enclosure comprises at least one of quartz, and polytetrafluoroethylene.

68. The system of claim 63, wherein the cooling fluid is further configured to remove particles from the at least one ultraviolet lamp.

* * * * *